United States Patent [19]

Kanai et al.

[11] Patent Number: 4,554,651
[45] Date of Patent: Nov. 19, 1985

[54] MAGNETO-OPTICAL RECORDING MEDIUM AND METHOD FOR PREVENTING THE ERASING OF THE INFORMATION RECORDED ON THE MAGNETO-OPTICAL RECORDING MEDIUM

[75] Inventors: Mikio Kanai; Hideki Hatano; Norikiyo Tajiri; Sakashi Otaki; Sigeru Kato, all of Tokorozawa, Japan

[73] Assignee: Pioneer Electronic Corporation, Tokyo, Japan

[21] Appl. No.: 384,674

[22] Filed: Jun. 2, 1982

[30] Foreign Application Priority Data

Jun. 4, 1981 [JP] Japan .................. 56-086148
Jun. 4, 1981 [JP] Japan .................. 56-086149

[51] Int. Cl.⁴ .................. G11B 11/00; G11B 15/04
[52] U.S. Cl. .................. 369/13; 369/110; 360/114; 360/60
[58] Field of Search .................. 369/13, 100, 110–111; 360/59, 60, 114; 365/121, 122

[56] References Cited

U.S. PATENT DOCUMENTS 4,003,088 1/1977 Schwartz .................. 360/60

FOREIGN PATENT DOCUMENTS 54-111321 8/1979 Japan .................. 360/60
55-123750 9/1980 Japan .................. 360/60

OTHER PUBLICATIONS

Imamura et al, Japanese Journal of Applied Physics, vol. 19, No. 12, 12/80, pp. L731–L734.

Primary Examiner—Robert L. Richardson
Attorney, Agent, or Firm—Fleit, Jacobson, Cohn & Price

[57] ABSTRACT

Disclosed is an optical recording medium having a vertical magnetization film on which information is recorded along with an optically readable sign indicating whether or not erasing of recorded information is permitted. Also disclosed is a system for recording information on the recording medium, whereby the erasing of the information recorded on the recording medium is inhibited or permitted in accordance with a sensed sign on the recording medium.

3 Claims, 5 Drawing Figures

MAGNETO-OPTICAL RECORDING MEDIUM AND METHOD FOR PREVENTING THE ERASING OF THE INFORMATION RECORDED ON THE MAGNETO-OPTICAL RECORDING MEDIUM

BACKGROUND OF THE INVENTION

1. Field of the Invention

The present invention relates to a magneto-optical recording medium and a method for preventing erasure of the information recorded on the magneto-optical recording medium, and more particularly to a recording medium having a vertical magnetization film onto which the information is recorded and read out by an optical means such as a laser beam, and a method for preventing the erasing of the information recorded on this type of recording medium.

2. Description of the Prior Art

In recent years, recording systems have been proposed wherein the information is recorded and played back by effectively utilizing the magneto-optical characteristics of an amorphous (noncrystalline) alloy material which is used as the recording medium.

This is due to the fact that the amorphous alloy thin film is a "vertical magnetization film" in which the direction of magnetization is perpendicular to the surface of the film.

Recording of the information on this amorphous thin film takes place in a manner such that the orientation or the direction of magnetization of the desired portions of the amorphous alloy film, which is initially magnetized in a preselected direction, is turned over by heating those portions above the Curie temperature or a compensation temperature under the condition of application of a weak external magnetic field.

More specifically, the amorphous alloy thin film which is previously downwardly (corresponding to the binary "0" signal) magnetized is effected by a weak upward bias magnetic field and only the portions of the thin film on which the "1" signal is to be recorded are applied with the laser beam so as to raise the temperature of those portions above the Curie temperature or a compensation temperature to cause the change in the direction of magnetization.

On the other hand, the reading out of the information recorded on the thin film takes place by utilizing the magnetic Kerr effect which is an interaction between the magnetism of substance and the light beam.

When a linearly polarized laser beam is reflected by the magnetized thin film, the plane of polarization is rotated in a direction which is determined by the direction of the magnetization.

Therefore, the information recorded on the amorphous thin film is read out by detecting the direction of rotation of the plane of polarization of the reflected laser beam by means of an analyzer.

FIG. 1 shows a schematic illustration of an example of this type of record and playback system using a magneto-optical recording disc. With such a system, utilizing the vertical magnetization of thin film, it is advantageous that the information can be rewritten, which is referred to as "reversible recording". This type of system, however, has suffered from the problem that the recorded information may erroneously or unintentionally be erased.

SUMMARY OF THE INVENTION

An object of the present invention is therefore to provide an optical recording medium which is free from the problem of erroneous erasure of the recorded information.

Another object of the invention is to provide a method for preventing the erroneous erasing of the information recorded on an optical recording medium.

According to the present invention, the optical recording medium having the feature of reversible recording is characterized by the provision of an optically readable sign indicating whether or not erasing is permitted.

According to an aspect of the invention, the optically readable sign takes the form of an optical pattern formed on a portion of the recording medium whose transmittance or reflectance of light is different from that of the other portions of the recording medium.

According to another aspect of the invention, the optically readable sign takes the form of a signal indicating whether or not erasing is permitted, which signal is added to the information recorded on the recording medium.

According to still another aspect of the invention, a method for preventing the erasing of the information recorded on the optical recording medium is characterized by optically sensing the sign on the recording medium, and inhibiting the erasing of information in accordance with the presence or the absence of the sign.

According to still a further aspect of the invention, a method for preventing the erasing of the information recorded on the optical recording medium is characterized in that before erasing the information on the recording medium, an erasing inhibit control is effected by reading a signal indicating whether or not the erasing is permitted, by means of a pickup means in the playback system.

The foregoing and other objects and advantages of the invention will become more clearly understood from the following description taken in conjunction with the accompanying drawings.

DETAILED DESCRIPTION OF THE PREFERRED EMBODIMENTS

Figure 1:
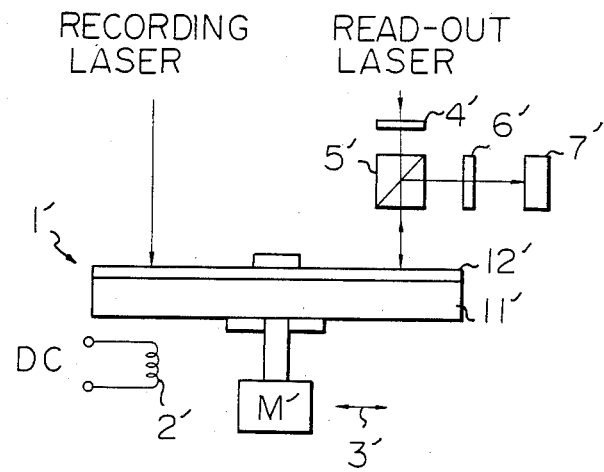
FIG. 1 is a schematic illustration of a prior art record and playback system including a megneto-optical recording medium.

Referring first to FIG. 1, there is shown a disc 1' comprising a base 11' of a dielectric material such as glass and an amorphous alloy thin film 12' formed thereon. Disc 1' is driven by a motor M' and rotates at a high rotational speed. The thin film 12' is made of a material such as Gadlinium Iron (GdFe) or Gadlinium Cobalt (CdCo) and forms a vertical magnetization film.

In order to record the information, a recording laser beam is applied to and focussed on this thin film 12' and a biasing coil 2' is provided at a position beneath this point.

At the time of recording, the disc 1' is rotated at a high speed by the motor M' and is slowly translated along a radial axis thereof as shown by the arrow 3. Rotation and translation occur at the same time.

The recording of information takes place by applying the recording laser beam, which is modulated in accordance with the information to be recorded (not shown), on this rotating disc 1'.

Another laser beam source is provided for the in playback operation device. At the time, of such playback, the playback laser beam is supplied and directed on the recording surface of the thin film 12' via a polarization lens 4' and a half prism 5'.

The reproduction of the recorded information takes place by determining the direction of rotation of the polarization plane of the reflected laser beam, which is obtained by the half prism 5', an analyzer 6' and a light detector 7'.

In the case of recording or rewriting the information, a reversing or ablation operation is effected by unifying the orientation of magnetization of the thin film 12' by a strong magnetic field, oriented in a downward direction, which is formed by an erase coil (not shown).

After that, the new information can be recorded on the thin film 12' in the same manner as described hereinbefore.

Figure 2:
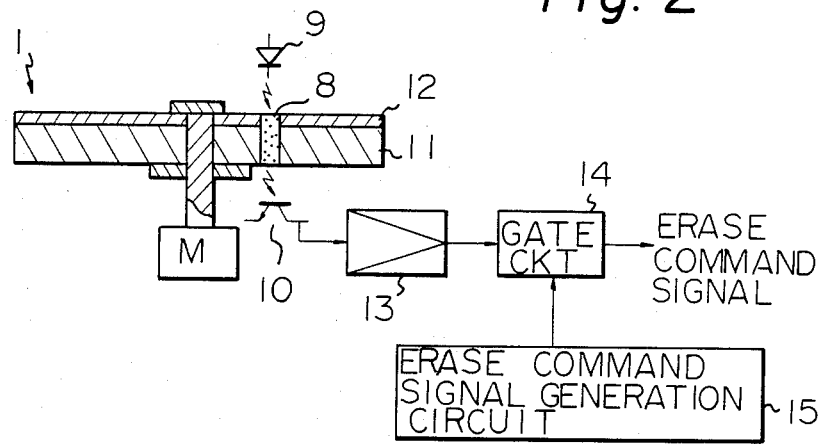
FIG. 2 is an illustration showing a cross-section of a recording medium and showing a block diagram of a record and playback system, both following the teachings of the present invention, for illustrating the inventive method for preventing erroneous erasure of information recorded on the recording medium.

With reference now to FIG. 2, an embodiment of the inventive recording medium will be described.

In FIG. 2, a recording disc 1 comprises a base 11 made of a dielectric material such as glass, and an amorphous alloy thin film 12 formed thereon. As shown, at a predetermined portion of the disc 1 at the inner portion of the recording track for example, a transparent region 8 having a high transmittance of light is formed so that it leads from one side to the other of the disc 1.

In order to detect the presence of transparent region 8, the record and playback system used with this recording disc 1 is provided with a photo interrupter comprising a light emitting device 9 and a light sensing device 10 which are positioned at opposite sides of the disc 1.

In using this system, if the recorded information should not be erased, the recording disc having this transparent region 8 is used as is. On the other hand, if the recorded information is intended to be erased, the disc is used with at least one of the upper or the lower face of the transparent region 8 covered by a non-transparent material.

The output signal of the light sensing device 10 of the photo interrupter is amplified by an amplifier 13 and used for controlling the state of a gate circuit 14. An erase command signal generation circuit 15 is controlled by the output signal of the gate circuit 14.

In the case of the above-described recording medium, the gate circuit 14 is adapted to close when the light sensing device 10 turns conductive upon receiving the light which passes through the transparent region 8 of the disc 1. Thus, the passage of the erase command signal through gate 14 is blocked, thereby preventing the energization of the erase circuit (not shown).

If the light sensing device 10 remains non-conductive (as when a non-transparent material covers the transparent material in the transparent region 8), the gate circuit 14 is opened, thereby permitting the erasing and the rewriting of new information; that is, an erase command signal from circuit 15 can pass through gate 14, as shown by the "Erase Command Signal" legend of FIG. 2.

Furthermore, the erroneous erasing of the recorded information can be completely eliminated by a sequential control of the operation of the system. That is, the detection of the optical pattern of the transparent region 8 can be effected initially when the disc 1 is loaded on the system and the recording operation is started.

Figure 3:
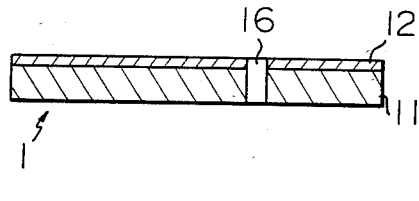
FIG. 3 is a cross-section of another embodiment of the recording medium according to the present invention.

Reference is now made to FIG. 3, in which the second embodiment of the recording medium is illustrated.

This embodiment features a through hole 16 provided at a predetermined position of the recording disc 1. In a similar manner as in the previous embodiment, the presence of the through hole 16 is detected by a photo interrupter 9 and 10 connected to a detecting amplifier 13, gate circuit 14, and erase command signal generation circuit 15 shown in FIG. 2. Also in the case of this embodiment, if erasing is to be permitted, at least one of the upper or the lower end of the through hole 6 is covered by a non-transparent material.

As a modification of the last-described embodiment, the recording disc 1 may preferably be provided with a tear-away portion enclosed by a perforation which is readily cut away from a through hole when it is desired that erasing not be permitted.

In addition, the through hole (or transparent portion) may be used to indicate the ability to erase (in contrast with the previous cases wherein the passage of light indicated the inability to erase). In that case, it is sufficient to change the operation of the gate circuit 14 so that it operates in the inverse logic relation to the previous cases.

Figure 4:
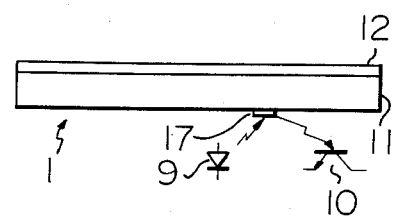
FIG. 4 is a side view of still another embodiment of the recording medium according to the present invention.

FIG. 4 shows a third embodiment of the present invention.

This embodiment features a recording disc 1 provided with a marker film 17 of high reflectivity such as a sensing tape. Also in this case, the light sensing device 10 of the photo interrupter may be used to sense the presence or absence of the marker film 17. The output signal of the light sensing device 10, which receives the light reflected by the surface of the marker film 17 from the light emitting device 9 located on the same side of disc 1, is connected to the circuits 13 to 15 as shown in FIG. 2, which execute similar operations as those previously described.

If the erasing of the recorded information is to be permitted, it is contemplated that the marker film 17 be removed from the disc 1.

Again, it is contemplated that the presence or absence of the marker film 17 may be used to indicate the ability or the inability to erase in an inverse manner to the described hereinabove.

Furthermore, in place of controlling the passage of an erase command signal, energization of the erasing coil may be controlled in accordance with the detection of a signal directly from the disc 1 if the system is arranged to erase the contents of the recording disc by means of an erasing coil. Also, in the case of the system using a weak bias magnetic field and erasing laser beam as shown in FIG. 1, either one of the magnetic field or the laser beam may be controlled in accordance with the detection of the sign on the disc.

Figure 5:
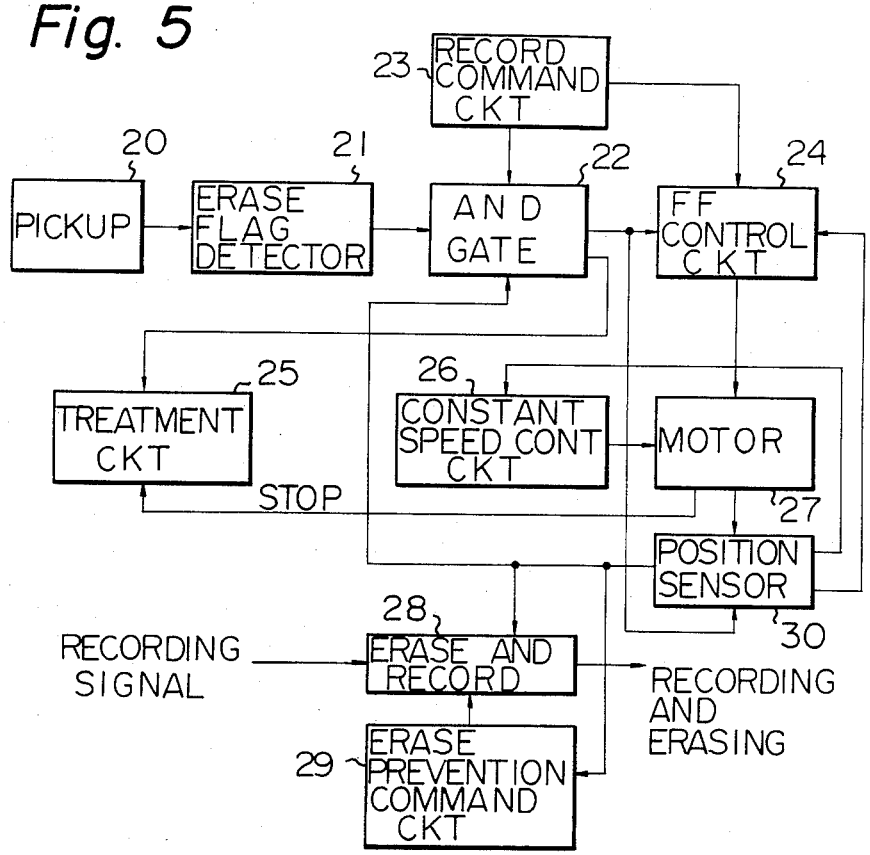
FIG. 5 is a block diagram of a recording system showing another embodiment of the inventive method for preventing erroneous erasure of information recorded on the recording medium.

Turning to FIG. 5, the fourth embodiment of the present invention will now be described.

The fourth embodiment is characterized by the feature that a signal controlling the erasure of information is recorded directly on the recording medium. In the case of the magneto-optical recording medium shown in FIG. 1, for example, a signal having a suitable format corresponding to the ability or inability to erase (referred to as erasing flag hereinafter) is recorded on the initial portion of the recording track for recording information such as a video signal.

For example, this erasing flag may be a digital code of 101010 . . . , and the system may preferably be arranged to function accordingly when the digital code is not present.

In FIG. 5, the reference numeral 23 indicates a record command circuit which is actuated after the disc is loaded on the system. The output signal from the record command circuit 23 is fed to a carriage motor fast forward control circuit 24, which is operated to move a laser spot into the inner side of the recording track. When the laser spot reaches a predetermined start position, the control circuit 24 is supplied with a stop control signal from a position sensor 30. The stop control signal also is applied to a carriage motor constant speed control circuit 25, through which a carriage motor 27 is driven at a constant speed to start the read out of the information.

The information read out by a pickup 20 is reproduced in its original form, and is transmitted to an erase flag detector 21. If the predetermined code of the erase flag is detected, a detection signal is supplied to an AND gate 22. The output signal of the AND gate, which also receives signals from other parts of the system for determining whether or not the system is ready for recording, is applied to a treatment circuit 25 to operate a display device and to stop the carriage motor 27, thus erroneous erasing is prevented and the operation of the system is displayed to the user of the system.

If the erase flag is not present, the carriage motor fast forward control circuit 24 is operated to skip the portion of the recording track on which the erase flag should have been recorded. In synchronization with this operation, a position sensor sequencer circuit 30 receives a signal indicating that the reading of signals on the recording track of the erase flag is finished. After that, the carriage is returned to the inner initial position (the head position) of the recording track by the fast mode operation of the drive motor. Then the sequencer circuit 30 produces a command signal to the carriage motor constant speed control circuit 26 to drive the carriage drive motor at the constant speed.

At the same time, an erase and record circuit 28 is started by a command from the sequencer circuit 30 and transmits a signal from an erase prevention command circuit 29 to be recorded on the recording track of the erase flag. In this manner, rerecording is permitted, and a fresh "do not erase" signal is provided for preventing further erasing operation.

Above, preferred embodiments of the present invention have been described. It should be understood, however, that the foregoing description has been for illustrative purposes only, and is not intended to limit the scope of the invention. Rather, there are numerous equivalents to the preferred embodiments and such are intended to be covered by the appended claims.

What is claimed is:

1. A magneto-optical recording medium comprising a first side with a vertical magnetization film on which information is recorded, and the medium including a sign indicating whether or not erasing of the information is permitted, said sign comprising an optically readable pattern provided on a second side of said recording medium and whose reflectance of light is different from that of the other portions of the second side of the recording medium.

2. A method for preventing erroneous erasing of information recorded on a magneto-optical recording medium, comprising the steps of starting the reading of information recorded on the recording medium by means of a pickup device in response to a record command signal; sensing, from a pickup output signal, data provided within a predetermined part of the recorded portion of said recording medium, said data indicating whether or not erasing is permitted; inhibiting erasing when data for preventing the erasing is sensed by said sensing step; and selecting a fast forward mode of reading the recorded information thereby shortening the time required for reading the information recorded in the remaining portion of said predetermined part, and then moving the pickup device to a head position of said predetermined part for starting the recording of information including the recording of data indicative of inhibiting/permitting the recording when said data for preventing the erasing is not sensed by said sensing step.

3. A system for erasing stored information and recording new information on a magneto-optical recording medium having a recording portion, the system comprising a pickup means for reproducing information recorded on the recording medium and producing a pickup output signal; drive means for varying the relative position between said pickup means and the recording medium; erasing/recording means for erasing stored information and recording new information on a recording medium; sensing means for sensing data as part of said pickup output signal indicating whether or not the stored information should be erased, which data is provided within a predetermined part of the recorded portion of the recording medium; and a control means, on one hand, for stopping operation of the erasing/recording means if the data detected from said recording medium indicates that the recorded information should not be erased and, on the other hand, for operating said drive means in a fast forward mode to shorten the time required for reading data recorded in the remaining portion of said predetermined part, for operating the drive means to move the pickup device to a head position of said predetermined part and for operating the erasing/recording means for starting the recording of information including the recording of data indicative of inhibiting/permitting the recording when the data for preventing the erasing is not sensed by said sensing step.

* * * * *